US009191396B2

(12) United States Patent
Nesbitt et al.

(10) Patent No.: US 9,191,396 B2
(45) Date of Patent: Nov. 17, 2015

(54) IDENTIFYING SOURCE OF MALICIOUS NETWORK MESSAGES

(75) Inventors: Richard E. Nesbitt, Holly Springs, NC (US); Brian M. O'Connell, Cary, NC (US); Herbert D. Pearthree, Cary, NC (US); Kevin E. Vaughan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 3296 days.

(21) Appl. No.: 11/221,619

(22) Filed: Sep. 8, 2005

(65) Prior Publication Data

US 2007/0064697 A1     Mar. 22, 2007

(51) Int. Cl.
*H04L 29/06*     (2006.01)

(52) U.S. Cl.
CPC ........ *H04L 63/1408* (2013.01); *H04L 63/1458* (2013.01); *H04L 63/1466* (2013.01); *H04L 2463/141* (2013.01); *H04L 2463/146* (2013.01)

(58) Field of Classification Search
CPC .................... H04L 63/1458; H04L 2463/141; H04L 63/1408; H04L 63/1466; H04L 2463/146
USPC ......... 726/22, 23, 25; 713/181; 370/229, 254, 370/352, 392; 709/229, 238, 239
See application file for complete search history.

(56) References Cited

U.S. PATENT DOCUMENTS

| | | | |
|---|---|---|---|
| 6,061,331 A | | 5/2000 | Conway et al. ............... 370/232 |
| 6,112,248 A * | | 8/2000 | Maciel et al. ................ 709/238 |
| 6,131,123 A * | | 10/2000 | Hurst et al. .................... 709/238 |
| 6,185,619 B1 * | | 2/2001 | Joffe et al. ..................... 709/229 |
| 6,611,874 B1 * | | 8/2003 | Denecheau et al. .......... 709/239 |
| 6,646,989 B1 * | | 11/2003 | Khotimsky et al. ........... 370/238 |
| 6,725,047 B1 * | | 4/2004 | Farley et al. ............... 455/456.3 |
| 6,735,702 B1 * | | 5/2004 | Yavatkar et al. ................ 726/13 |

(Continued)

FOREIGN PATENT DOCUMENTS

| | | |
|---|---|---|
| JP | 2003333092 A | 11/2003 |
| WO | 2004051946 A1 | 6/2004 |

OTHER PUBLICATIONS

Chan et al., "IDR: An Intrusion Detection Router for Defending against Distributed Denial-of-Service (DDoS) Attacks," Proceedings of the 7th International Symposium on Parallel Architectures, Algorithms and Networks (ISPAN'04), 2004.*

(Continued)

*Primary Examiner* — Kari Schmidt
(74) *Attorney, Agent, or Firm* — Yee & Associates, P.C.; Lisa J. Ulrich

(57) ABSTRACT

System, method and program for identifying a subset of a multiplicity of source networks. The subset including one or more source networks which have sent messages to one of a plurality of destination locations having a same IP address. For each of the multiplicity of source networks, a determination is made whether there are fewer intervening hops from the source network to the one destination location than from the source network to other of the plurality of destination locations. If so, the source network is included in the subset. If not, the source network is not included in the subset. One application of the present invention is to identify a source of a denial of service attack. After the subset is identified, filters can be sequentially applied to block messages from respective source networks in the subset to determine which source network in the subset is sending the messages.

12 Claims, 4 Drawing Sheets

(56) References Cited

U.S. PATENT DOCUMENTS

| | | | |
|---|---|---|---|
| 6,820,133 B1* | 11/2004 | Grove et al. | 709/238 |
| 7,007,302 B1* | 2/2006 | Jagger et al. | 726/25 |
| 7,065,042 B1* | 6/2006 | Pan et al. | 370/229 |
| 7,200,120 B1* | 4/2007 | Greenberg et al. | 370/254 |
| 7,302,705 B1* | 11/2007 | Boivie | 726/22 |
| 7,327,695 B2* | 2/2008 | Molnar et al. | 370/255 |
| 7,360,245 B1* | 4/2008 | Ramachandran et al. | 726/13 |
| 7,376,087 B2* | 5/2008 | Srikrishna | 370/238 |
| 7,409,712 B1* | 8/2008 | Brooks et al. | 726/22 |
| 7,529,943 B1* | 5/2009 | Beser | 713/181 |
| 7,530,112 B2* | 5/2009 | Smith | 726/28 |
| 7,565,550 B2* | 7/2009 | Liang et al. | 713/188 |
| 7,593,988 B2* | 9/2009 | Oreizy et al. | 709/205 |
| 7,676,217 B2* | 3/2010 | Zhu et al. | 455/411 |
| 7,725,708 B2* | 5/2010 | Wu et al. | 713/151 |
| 7,814,546 B1* | 10/2010 | Strayer et al. | 726/23 |
| 2002/0138471 A1 | 9/2002 | Dutta et al. | 707/3 |
| 2003/0084321 A1* | 5/2003 | Tarquini et al. | 713/200 |
| 2003/0147406 A1* | 8/2003 | Spear et al. | 370/401 |
| 2003/0149777 A1 | 8/2003 | Adler | 709/228 |
| 2003/0188189 A1* | 10/2003 | Desai et al. | 713/201 |
| 2005/0132219 A1* | 6/2005 | Robert | 713/201 |
| 2006/0056411 A1* | 3/2006 | Badat et al. | 370/392 |
| 2006/0077964 A1* | 4/2006 | Wu et al. | 370/352 |
| 2006/0155865 A1* | 7/2006 | Brandt et al. | 709/230 |
| 2006/0215547 A1* | 9/2006 | Koppol | 370/220 |

OTHER PUBLICATIONS

Sanzgiri, Kimaya, et al. "A secure routing protocol for ad hoc networks." Network Protocols, 2002. Proceedings. 10th IEEE International Conference on. IEEE, 2002.*

Jin, Cheng, Haining Wang, and Kang G. Shin. "Hop-count filtering: an effective defense against spoofed DDoS traffic." Proceedings of the 10th ACM conference on Computer and communications security. ACM, 2003.*

"An Empirical Analysis of Target-Resident DoS Filters", Collins et al., Proceedings 2004 IEEE Symposium on Security and Privach, 2004, May 9-12, 2004, pp. 103-114.

Takayuki Fujino et al., "A Method for Server Distribution in a Wide Area Network Using Label Switching Technology", Information Processing Society of Japan, Technical Report, IN203-149, Dec. 12, 2003, pp. 35-40 (english abstract).

JPO office action Dec. 21, 2010.

* cited by examiner

US 9,191,396 B2

IDENTIFYING SOURCE OF MALICIOUS NETWORK MESSAGES

FIELD OF INVENTION

The present invention relates generally to computers and networks, and more particularly to a technique to identify a source of malicious messages sent over a network.

BACKGROUND OF INVENTION

Networks such as intranets, extranets and the Internet are well known today. Computers and other devices reside on respective networks. (Some routers are contained within firewalls which perform a screening function as well as a routing function.) When a computer on one "source" network sends a message addressed to a computer on another, "destination" network, the message is forwarded from one router to the next until it reaches the destination network. There may be an Internet Service Provider ("ISP") for the destination network, and a "site" router at the destination network to forward the message to the destination computer. Thus, computers and other electronic devices on different networks can communicate with each other.

Each message is divided into packets for transmission and routing according to a known internet protocol (IP) standard. Each packet includes a header and a payload. The header includes the IP address of the destination host, and the routers uses the IP address to know where to forward the message. The payload includes data such as a request or information. The payload also includes information such as the application port to provide the requested service, and the site router uses all of this information to determine which computer within the network to receive and process the message packet.

Most hosts have a respective, unique IP address. The source host embeds the IP address of the destination host in the header of each message packet. When the source network sends the message packets, routers en route to the destination network forward the message packets from router to router (in "hops") until they reach the destination host. In a "multi-netting" architecture, there is more than one site network or destination network (typically owned by the same company) broadcasting the same IP address. Each such site has a different physical location, different site router and different MAC address (representing the respective site router). There are also one or more ISPs for each destination network within the multi-net, logically interposed between the site router for the destination network and the Internet (with its routers). The source network embeds the IP address of the multi-net in each message packet (probably unaware that the destination is a multi-net). When the source network sends the message packets, the routers en route to the multi-site send the messages to one of the ISP(s) for the multi-net along the path with the fewest hops, as described below.

Often, there are multiple possible paths or routes between a source network and a destination network (or site router). The routers know the various paths based on ongoing exchanges of router and network "topology" information between the routers. Typically, each router will determine a shortest (available) path to use for a message packet to reach its destination network, and then forward the message packet to the next (downsteam) router/hop in the path. There are different standards/protocols that can be used by each router to identify the shortest path to the destination network, such as Routing Information Protocol ("RIP"), Open Shortest Path First ("OSPF"), and Border Gateway Protocol ("BGP"). In the "BGP" protocol, each router broadcasts to other routers the path it uses to get to a destination network, via other routers or "nodes". For example, a router B may broadcast that it uses router C to get to network D, a router G may broadcast that it uses router C to get to network D, a router I may broadcast that it uses routers F, G, and C to get to network D, and a router E may broadcast that it uses routers E, F, G, and C to get to network D. Based on these broadcasts, router F may determine that its shortest path to network D is via routers G and C, and forward message packets addressed to network D to router G. Router G will then forward these message packets to router C, and router C will forward these message packets to network D. In the OSPF protocol, "adjacent" routers exchange topological information. Typically, one router on each LAN exchanges topological information with neighboring routers. The OSPF protocol dictates that each router will send a message to its "adjacent" routers providing its state and network routing "costs." The adjacent router then broadcasts the complete routing topology to all neighboring routers. The neighboring routers use this information to determine which path is best to send network traffic.

Unfortunately, many computers operated by "hackers" send "malicious" messages to other computers, typically via the Internet. One type of malicious messages can form a "denial of service" attack. In a denial of service attack, the individual messages may request ordinary services from the destination computer, but the messages are so numerous that they overwhelm the resources of the destination computer or the transiting networks. This degrades the performance/response time of the destination computer or networks for legitimate users/customers and, in extreme cases, may shut down the destination computer altogether.

When a denial of service attack occurs, it was known to trace back to their source network the messages suspected of being malicious. The trace back was performed by looking up the source network address in the received message header. After tracing back the messages to the source network, it was known to apply a filter in a firewall or site router to block subsequent messages from the IP address of this source network. However, it is not easy to identify the messages that are malicious. Also, to hide their identity, some hackers embed a phony source IP addresses in the message packets that they send. This is commonly referred to as source IP address "spoofing." Consequently, when the destination network receives these message packets, the destination network (and its administrator) cannot identify the real source of the malicious messages, even when the malicious messages are identified and their headers examined.

Another known solution is to sequentially apply filters at the firewall or site router for the network subject to the denial of service attack. Each filter blocks a different individual or group of source IP addresses, and then checks if the malicious traffic is blocked. Unfortunately, this is a time consuming process, because there are typically many source IP addresses to block. Also, during the course of the tests, some bona fide messages may be blocked and lost, or unacceptably delayed.

An object of the present invention is to facilitate the identification of a source of malicious messages sent to a multi-net.

An object of the present invention is to facilitate the identification of a source of malicious messages sent to a multi-net environment, when the source IP address of the malicious message listed in the message packets is "spoofed."

Still another object of the present invention is to facilitate the identification of a source of malicious messages sent to a multi-net, where the malicious messages constitute a denial of service attack.

SUMMARY OF THE INVENTION

The present invention resides in a system, method and program for identifying a subset of a multiplicity of source networks. The subset including one or more source networks which have sent messages to one of a plurality of destination locations having a same IP address. For each of the multiplicity of source networks, a determination is made whether there are fewer intervening hops from the source network to the one destination location than from the source network to other of the plurality of destination locations. If so, the source network is included in the subset. If not, the source network is not included in the subset. One application of the present invention is to identify a source of a denial of service attack.

According to a feature of the present invention, after the subset is identified, filters are sequentially applied to block messages from respective source networks in the subset to determine which source network in the subset is sending the messages.

According to another feature of the present invention, the determination whether there are fewer intervening hops from the source network to the one destination location than from the source network to other of the plurality of destination locations, is made in part by collecting from routers information indicating a routing path from each of the multiplicity of source networks to each of the plurality of destination locations. From the router paths, a number of hops from each of the multiplicity of source networks to each of the plurality of destination locations is determined.

DETAILED DESCRIPTION OF THE PREFERRED EMBODIMENTS

Figure 1:
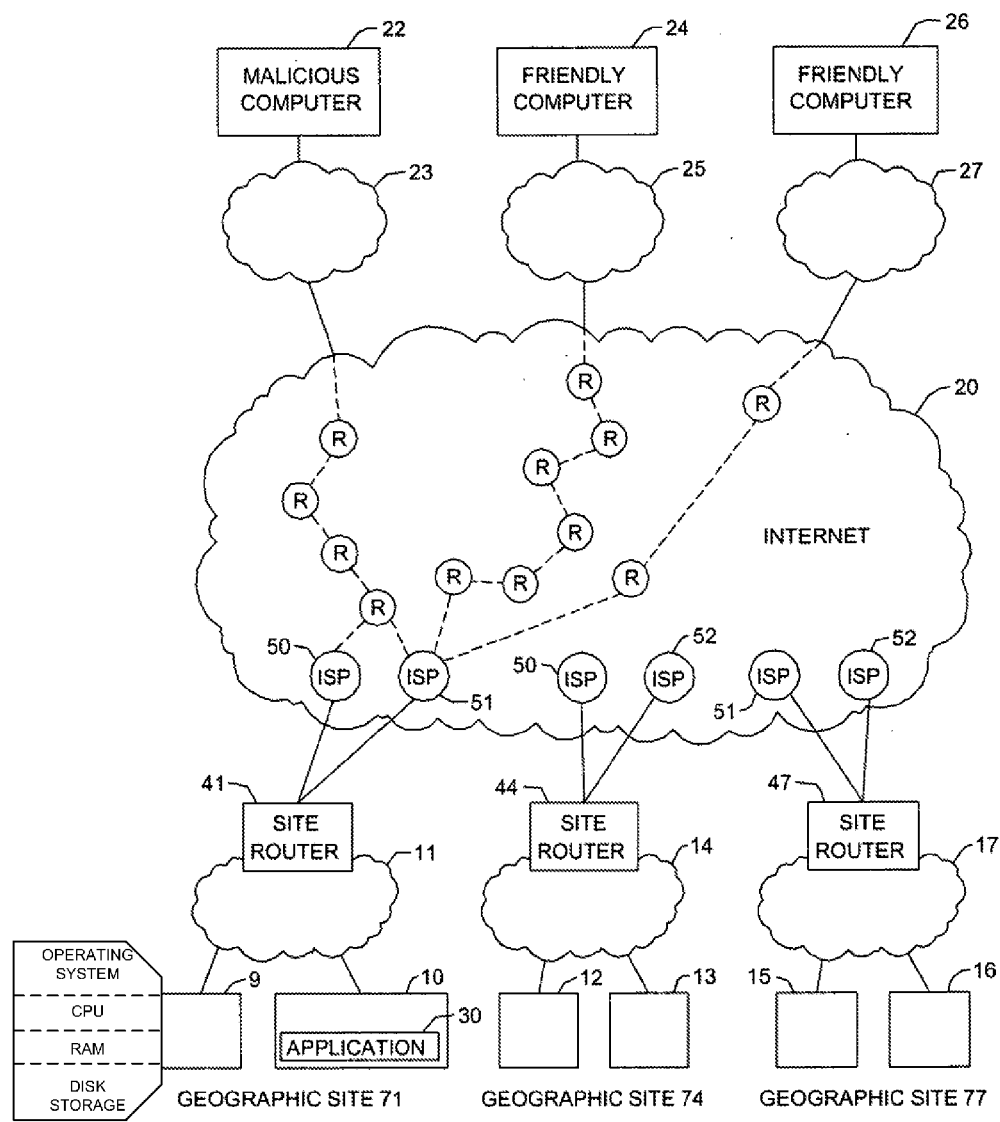
FIG. 1 is a block diagram of different networks including the Internet and a multi-net environment in which the present invention is incorporated.

The present invention will now be described in detail with reference to the figures. FIG. 1 illustrates server computers 9 and 10 on network 11 at physical location or site 71, server computers 12 and 13 on network 14 at physical location or site 74 and server computers 15 and 16 on network 17 at physical location or site 77. In this example, each of the networks 11, 14 and 17 has a respective site router 41, 44 and 47, which is connected to Internet 20. In this example, Internet Service Providers ("ISPs") 50 and 51 are logically interposed between site router 41 and the Internet, ISPs 50 and 52 are logically interposed between site router 44 and the Internet, and ISPs 51 and 52 are logically interposed between site router 47 and the Internet. In this example, two ISPs serve each of the networks 13, 15 and 17 to share workload, and in case one of the ISPs fails. In the following scenario, networks 11, 14 and 17 for all computers 9, 10, 12, 13, 15 and 16 have the same IP address (i.e. "multi-netting"), that is otherwise unique in the Internet. There are different physical locations for the different site routers and different IP addresses representing the respective site routers. When source networks send message packets to the common IP address of the multi-net, routers "R" within the Internet en route to the site routers select the closest site router of the multi-net 11, 14 and 17 to which to send the message packets, according to one of the well known routing protocols such as BGP or OSPF.

FIG. 1 also illustrates computer 22 on network 23, computer 24 on network 25, and computer 26 on network 27. Networks 23, 25 and 27 are connected to the Internet 20, and are source networks in the following scenario. Each of the networks 23, 25 and 27 has a single, unique IP address. In the following scenario, computer 22 is malicious and is sending numerous messages, such as data requests, echo requests, timestamp requests or source quenches to the common IP address for networks 11, 14 and 17. The intent of computer 22 is to overwhelm one or more computers 9, 10, 12, 13, 15 and/or 16, within networks 11, 14 and 17, the routers and networks in Internet 20, or any other network devices in the path with the numerous messages as a "denial of service" attack, and thereby degrade performance to legitimate or "friendly" requesters such as computers 24 and 26. Computers 24 and 26 are sending a much lesser amount of messages to application 30, and the messages from computers 24 and 26 are well intended.

The Internet comprises routers (labeled "R" in FIG. 1) between each of the source computers 22, 24 and 26 and each of the destination servers 9, 10, 12, 13, 15 and 16. The routers are multidirectional, i.e. can route messages in both directions between any pair of computers 9, 10, 12, 13, 15, 16, 22, 24 and 26, although in the following scenario, the messages flow from computers 22, 24 and 26 to computers 9, 10, 12, 13, 15 and 16.

When any computer 22, 24 or 26 wants to send a message, it divides the message into packets according to known internet protocols such as UDP, ICMP and TCP. Each packet includes a header with a source IP address and a destination IP address, and a payload which includes data such as a request or information. The payload also includes information such as the port of an application to provide the requested service, and the site router uses this information to determine which computer within the network to receive and process the message packet. Ideally, the source IP address is the real source IP address of the source network of the message. However, some hackers will program their source computers to embed a different source IP address in their message packet headers to attempt to hide their source networks and thwart some countermeasures, such as IP filters set to the source IP address in the malicious messages. The source computer sends each message packet to its ISP, gateway router or site router (which may be contained in a firewall) for the network on which the source computer resides. The ISPs, site routers, as well as other routers "R" within the Internet have information about the topology of other routers en route to the destination network, based on the routing protocol that they implement. For example, in the known OSPF protocol, routers broadcast to other routers and ISPs their existence (and implicitly the viability of themselves and associated links), information about other routers to which they are connected and router paths to destination networks. With information collected by each ISP and router from other routers, each router compiles the topology of adjacent routers, networks and router paths to networks. With this information, each router and ISP can determine at least the next hop of the shortest path to a destination server. Further details about OSPF can be found in RFC 2328, which document is hereby incorporated by reference as part of the present disclosure. In the known BGP protocol, each router also broadcasts to ISPs and other routers the router path it uses to get to various networks. For example, a router B may broadcast that it uses a router C to get to a network D, a router G may broadcast that it uses router C to get to network D, a router I may broadcast that it uses routers F, G, and C to get to network D, and a router E may broadcast that it uses routers E, F, G, and C to get to network D. Based on these broadcasts, router F will determine that its shortest path to network D is via routers G and C, and forward message packets addressed to network D to router G. Router G will then forward these message packets to router C, and router C will forward these message packets to network D. With the topology information obtained from other routers, each ISP and router can determine at least the next hop of the shortest path to a destination server. The information received by each router and ISP from other routers specifying routing paths to destination networks forms entries in a routing table. Further details about BGP can be found in RFC 1771, which document is hereby incorporated by reference as part of the present disclosure. Regardless of which routing protocol is used, the objective and affect of each routing protocol is to utilize a shortest routing path, typically a path with the fewest intervening routers or "hops" to a destination network. Thus, in these known protocols, when source computer 22, 24 or 26 sends a message addressed to the common IP address of (multi-net) networks 11, 14 and 17, the message is forwarded from one router to the next until it reaches the ISP for the closest (i.e. generally fewest hops) site router 41, 44 or 47 of the multi-net. Then, the ISP forwards the packet to the respective site router, and the site router forwards the message to the destination computer.

Figure 2:
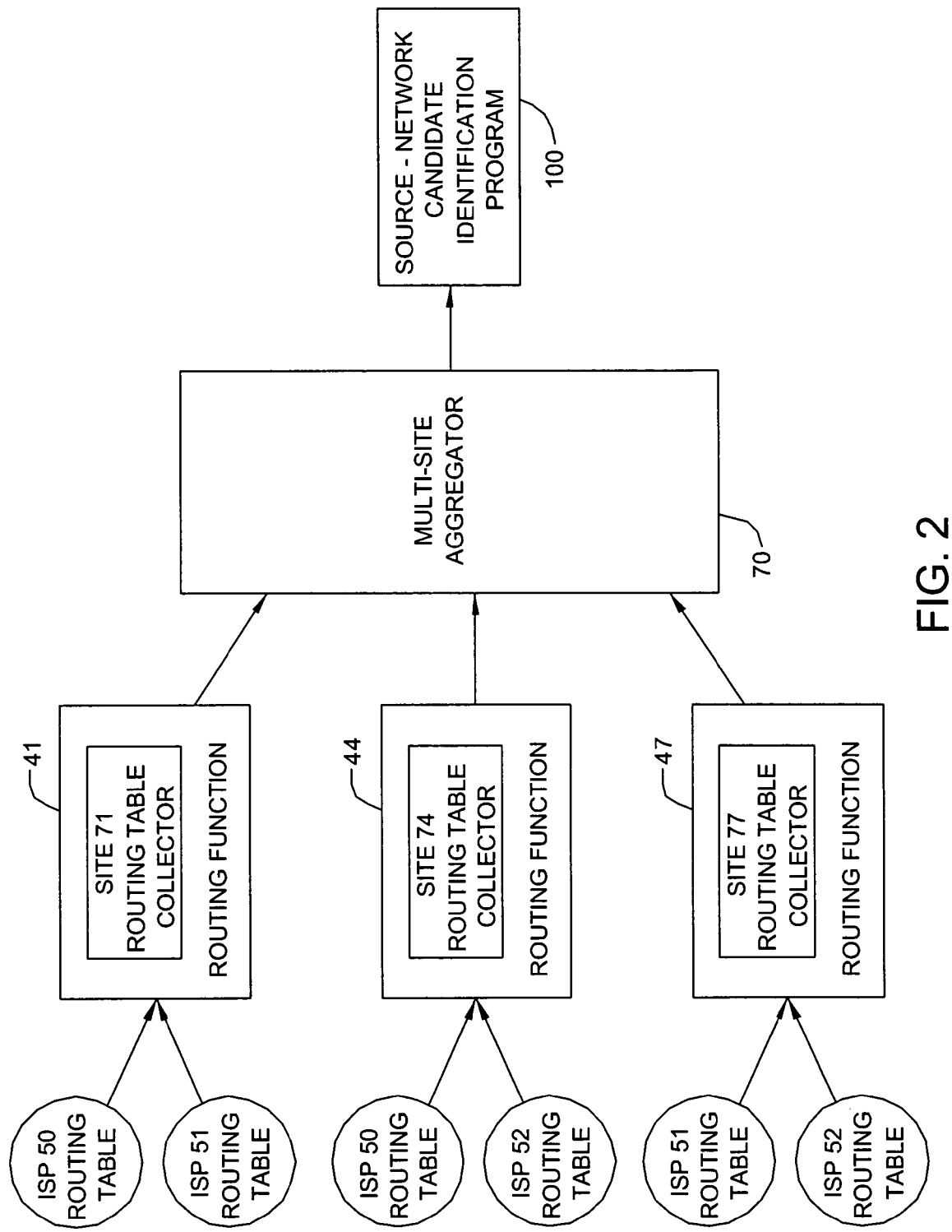
FIG. 2 is a more detailed block diagram of the multi-net environment of FIG. 1.
Figure 3:
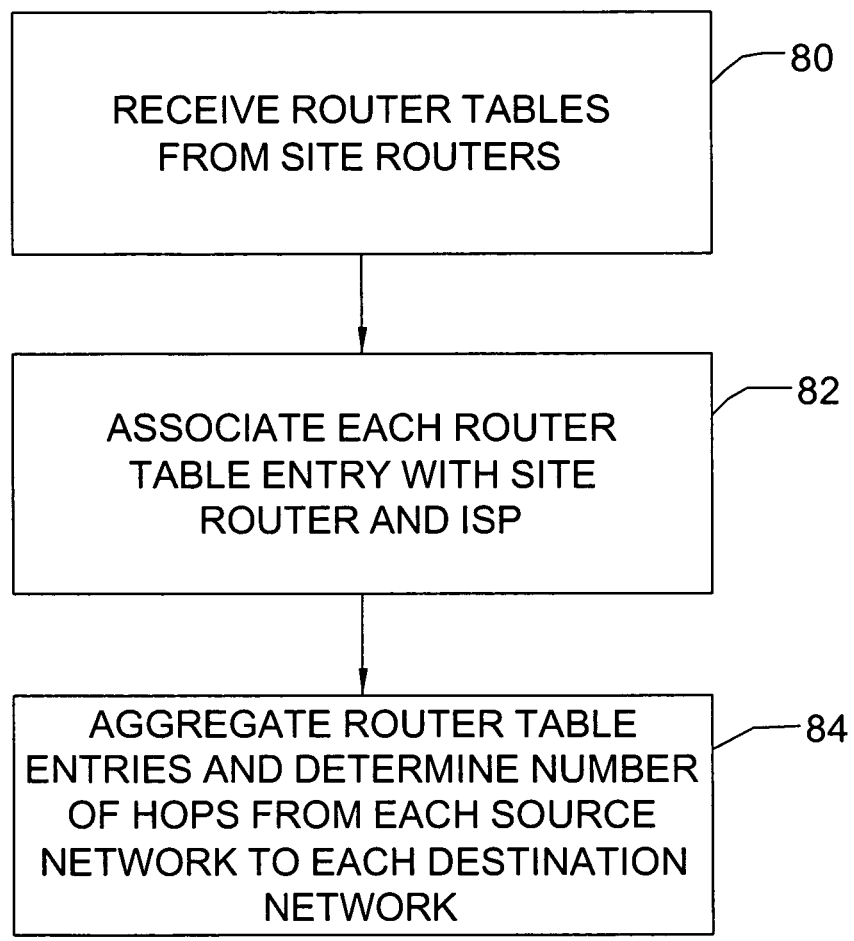
FIG. 3 is a flow chart of a multi-net aggregator program used by the present invention.

FIG. 2 illustrates receipt and aggregation of BGP (or other such) router tables at the ISPs 50,51, 50,52 and 51,52 of the respective destination networks 11, 14 and 17. After ISPs 50 and 51 receive the routing tables from Internet routers "R", ISPs 50 and 51 forward the routing tables to a routing table collector program 61 within gateway router 41. Likewise, after ISPs 50 and 52 receive the routing tables from Internet routers "R", ISPs 50 and 52 forward the routing tables to a routing table collector program 64 within gateway router 44. Likewise, after ISPs 51 and 52 receive the routing tables from Internet routers "R", ISPs 51 and 52 forward the routing tables to a routing table collector program 67 within gateway router 47. Periodically, each of the routing table collector programs 61, 64 and 67 forwards their routing tables to a multi-site router-table aggregator program 70. As further illustrated in FIG. 3, as program 70 receives router tables from routing table collector programs 61, 64 and 67 (step 80), program 70 associates each received router table with the ISP that forwarded the routing tables and the physical location of routers 41, 44 and 47 and the destination network associated with each routing path in the routing table (step 82). Program 70 then aggregates the information generated in step 82 and also counts and records the number of router hops from each source network to each destination network 11, 14 and 17 within the multi-net (step 84). Table 1 below is an example of a routing table.

TABLE 1

| Network | Next Hop | Metric | LocPrf | Weight | Path |
| --- | --- | --- | --- | --- | --- |
| * i3.0.0.0 | 157.130.42.201 | 100 | 0 | 701 | 703 80 i |
| * I | 157.130.42.209 | 100 | 0 | 701 | 703 80 i |
| * I | 157.130.30.141 | 100 | 0 | 701 | 703 80 i |
| * I | 157.130.30.245 | 100 | 0 | 701 | 703 80 i |
| * I | 157.130.30.249 | 100 | 0 | 701 | 703 80 i |
| * I | 157.130.30.141 | 100 | 0 | 701 | 703 80 i |

Table 2 below is an example of a record of the number of hops, generated from the routing tables, from each source network to each destination network within the multi-net, although in reality, there are usually many, many more source networks represented in the table.

TABLE 2

| Source Network ID | # of Hops to Destination Location 71 | # of Hops to Destination Location 74 | # of Hops to Destination Location 77 |
| --- | --- | --- | --- |
| Source Network 23 | 4 | 3 | 4 |
| Source Network 25 | 6 | 7 | 2 |
| Source Network 27 | 2 | 5 | 3 |

(Note:
in bold is fewest number of hops/shortest path from each source network to a destination network.)

When an administrator suspects a malicious attack such as a denial of service attack, the administrator invokes a source-network candidate-identification program 100 to determine a probable subset of source networks from which the malicious messages were sent, based in part on the routing tables such as Table 1 and the number-of-hops tables such as Table 2, compiled by program 70. In the example of Table 2, the first column has a row/entry for each of the source networks 23, 25 and 27 that have sent messages to the multi-net (although typically, there will be many more, even thousands of source networks). The second column represents destination location 71, and has a row/entry for the number of hops from each source network to destination location 71. The third column represents destination location 74, and has a row/entry for the number of hops from each source network to destination Location 74. The fourth column represents destination location 77, and has a row/entry for the number of hops from each source network to destination location 77.

By way of example, location 77 has received an abundance of malicious messages as a denial of service attack. An administrator invokes program 100 which checks Table 2 to determine which source network 23, 25 or 27 (and any other source network) has a fewer number of hops to location 77 than to locations 71 or 74 (or any other destination networks). In the example of Table 2, network 23 has more hops to location 77 (i.e. four), than to network 14 (i.e. three); network 25 has fewer hops to location 77 (i.e. two) than to locations 71 (i.e. six) or 74 (i.e. seven); and network 27 has more hops to location 77 (i.e. three) than to location 71 (i.e. two). Thus, the likely source of the malicious messages to location 77 is from source network 25. The reasoning is as follows. All locations 71, 74 and 77 have the same IP address, and the routing protocols of the Internet routers "R" attempt to minimize the number of hops from the source network to the destination network. If source network 23 had sent the malicious messages (instead of source network 25), then the malicious messages would have arrived at location 74 because that has the fewest intervening router hops. If source network 27 had sent the malicious messages (instead of source network 25), then the malicious messages would have arrived at location 71 because that has the fewest intervening router hops.

Figure 4:
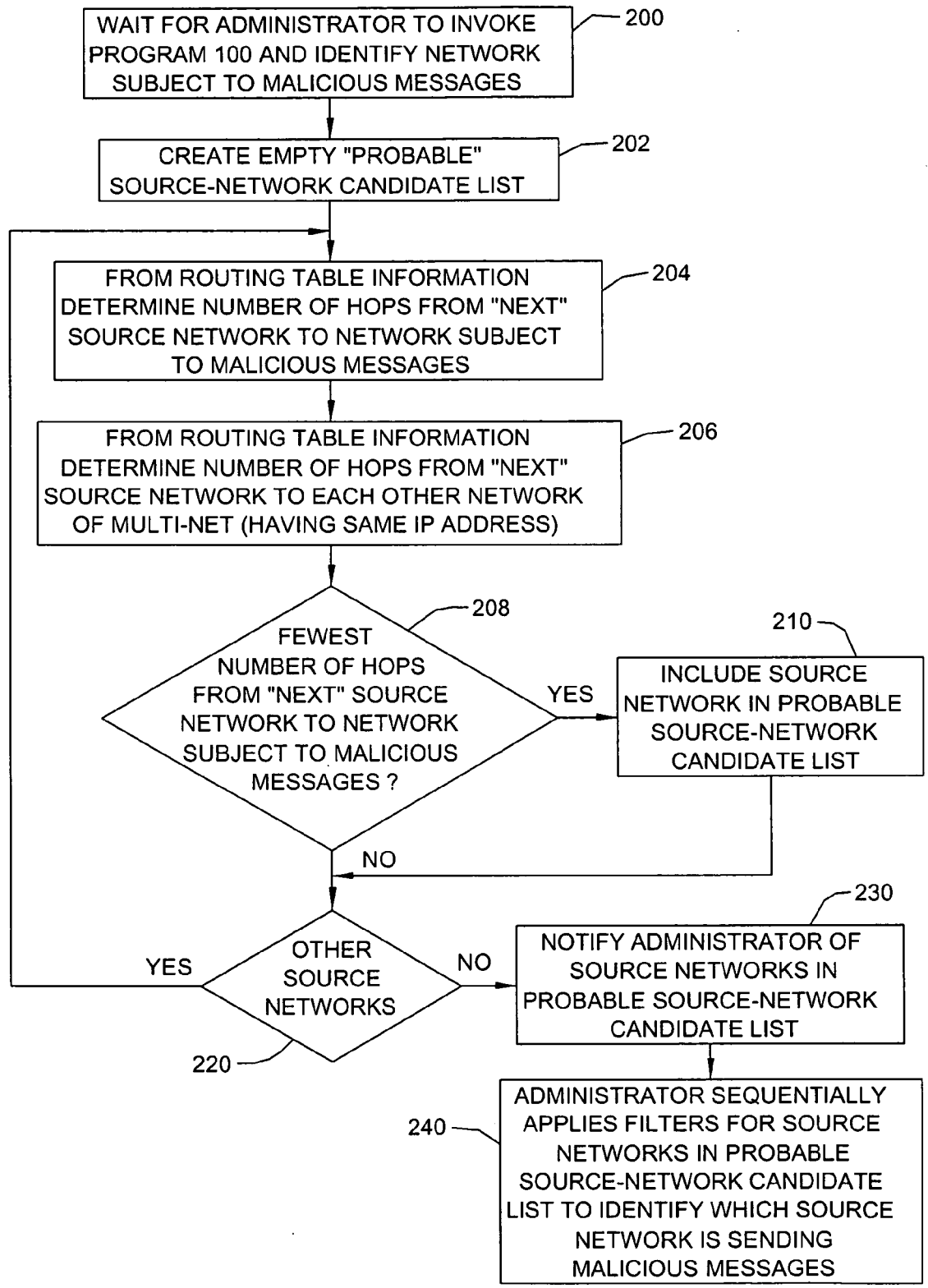
FIG. 4 is a flow chart of a source-network candidate-identification program which embodies the present invention.

FIG. 4 is a flow chart illustrating in more detail use and function of source-network candidate-identification program 100. In step 200, program 100 waits for a systems administrator of a company to invoke program 100, such as after the systems administrator detects a malicious denial of service attack. When invoking program 100, the administrator identifies to program 100 the destination address advertised out of network 11, 14 and 17 and the physical location which is under attack. For this example, assume that location 77 is under attack. When invoked, program 100 creates an empty "probable source-network candidate list" 201 for ISP 51 and 52 in location 77. Next, program 100 determines the number of hops from the first source network row in Table 2, i.e. network 23 to location 77 (step 204). Next, program 100 determines the number of hops from network 23 to location 71 (in the first source network row of Table 1) (step 206). Next, program 100 determines the number of hops from network 23 to location 74 (in the first source network row of Table 1) (step 206). Then, program 100 determines if the number of hops from source network 23 to location 77 is less than from source network 23 to location 71 and from source network 23 to location 74 (decision 208). If so (decision 208, yes branch), then program 100 records that source network 23 is a candidate on a "probable source-network candidate list" (step 210). In the illustrated example, the number of hops from source network 23 is less to destination location 74 than to destination location 77 (decision 208, no branch), so program 100 does not record source network 23 as a candidate on the probable source-list candidate list. Next, program 100 determines that there are other rows in Table 2, i.e. other source networks to consider as possibly the source of malicious messages to location 77 (decision 200, yes branch). So, program 100 repeats steps 204, 206 and 208 for the next row in Table 2, i.e. the entries for source network 25. During this iteration of step 204, program 100 determines that that are two hops from source network 25 to destination location 77. During this iteration of step 206, program 100 also determines that there are six hops from source network 25 to destination location 71, and seven hops from source network 25 to destination location 74. Then, during this iteration of decision 208, program determines that source network 25 has fewer hops to destination location 77 than to destination locations 71 or 74. So, during this iteration of decision 208 and step 210, program 100 enters source network 25 in the probable source-network candidate list. Next, program 100 determines that there is another row in Table 2, i.e. another source network to consider as possibly the source of malicious messages (decision 200, yes branch). So, program 100 repeats steps 204, 206 and 208 for the next row in Table 2, i.e. the entries for source network 27. During this final iteration of step 204, program 100 determines that that are three hops from source network 27 to destination location 77. During this final iteration of step 206, program 100 also determines that there are two hops from source network 27 to destination location 71, and five hops from source network 27 to destination location 74. Then, during this final iteration of decision 208, program determines that source network 27 has fewer hops to destination location 71 than to destination location 77. So, during this final iteration of decision 208, program 100 does not enter source network 27 in the "probable source-network candidate list". After the final iteration of steps 204-210, there is just one entry in the probable source-network candidate list, so program 100 notifies the systems administrator that source network 25 is the probable source of the malicious messages (step 230). In response, the ISP 51 or 52 systems administrator can install a rate limiting filter for the malicious traffic type on their router interface that connects to source network 25 (step 240). By applying the rate limiting filter only to the interface that connects to network 25, benign traffic is not blocked while the malicious traffic is blocked. Because program 100 does not base its identification of the probable source-network candidates on a source IP address contained in the messages received by location 77, it will not be fooled by an incorrect (or "spoofed") source IP address in such messages.

In a typical network environment, Table 2 will have thousands, even hundreds of thousands of rows representing thousands, even hundreds of thousands of source networks which have connected to location 77. After all the iterations of steps 204-210 are completed (for all of the rows in Table 2), there will on average be X/N number of candidates in the probable source-network candidate list, where "X" equals the total number of source networks which have connected to location 77 and "N" equals the total number of destination networks that transit through the ISP. In the illustrated example, there are three such destination networks, so program 100 on average will eliminate ⅔ of the source networks from further consideration; they are not the source of the malicious messages. Then, in step 240, the ISP systems administrator or an automated program function will install rate limiting filters (one interface at a time) in the ISP router that connects to the source networks on the probable source-network candidate list. In such a case, while program 100 did not identify a single source network as the source of the malicious messages, program 100 substantially reduced the number of candidates. This substantially reduced the number of filters to install to try to identify and then block the malicious messages.

Based on the foregoing, system, method and program for determining a list of source networks from which malicious messages have been disclosed. The program can be a computer program that is stored in a computer readable storage media, such as disk storage, for execution by a central processing unit (CPU) via computer readable storage such as random access memory (RAM). However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for identifying source of malicious network messages, said method comprising steps implemented by a computer of:

identifying a subset of a multiplicity of source networks, said subset including one or more source networks which have sent messages to one of a plurality of destination locations having a same Internet Protocol (IP) address, wherein identifying said subset comprises:

the computer determining for each of said multiplicity of source networks whether there are fewer intervening hops from said each source network to said one destination location than from said each source network to other of said plurality of destination locations;

responsive to a determination that there are fewer intervening hops for said each source network of said multiplicity of source networks, the computer identifying said each source network as included in said subset, and responsive to determining there are not fewer intervening hops for said each source network of said multiplicity of source networks, the computer not identifying said each source network as included in said subset;

wherein one or more source networks are continuing to send messages to said one destination location, and further comprising a step of sequentially applying filters to block messages from respective source networks in said subset to determine which source network in said subset is sending said messages, wherein one of said source networks in said subset has sent said messages to said one destination location and said messages are malicious.

2. A method as set forth in claim 1 wherein said one destination location has received many messages from a source network in said subset as part of a denial of service attack.

3. A method as set forth in claim 1 wherein the determining step comprises the step of:
  collecting from routers information indicating a routing path from each of said multiplicity of source networks to each of said plurality of destination locations.

4. A method as set forth in claim 3 wherein the determining step further comprises the step of:
  determining from said router paths a number of hops from each of said multiplicity of source networks to each of said plurality of destination locations.

5. A system for identifying source of malicious network messages, said system comprising:
  a CPU, a computer readable memory and a computer readable storage media;
  program instructions to identify a subset of a multiplicity of source networks, said subset including one or more source networks which have sent messages to one of a plurality of destination locations having a same Internet Protocol (IP) address, wherein said program instructions to identify said subset comprises:
    first program instructions to determine for each of said multiplicity of source networks whether there are fewer intervening hops from said each source network to said one destination location than from said each source network to other of said plurality of destination locations; and
    second program instructions, responsive to a determination that there are fewer intervening hops from said each source network to said one destination location than from said each source network to other of said plurality of destination locations, to identify said each source network as included in said subset, and responsive to a determination that there are not fewer intervening hops from said each source network to said one destination location than from said each source network to other of said plurality of destination locations, for not identifying said each source network as included in said subset;
  wherein one or more source networks are continuing to send messages to said one destination location, and further comprising program instructions to sequentially apply filters to block messages from respective source networks in said subset to determine which source network in said subset is sending said messages, wherein one of said source networks in said subset has sent said messages to said one destination location and said messages are malicious; and wherein
    all of the program instructions are stored on the computer readable storage media for execution by the CPU via the computer readable memory.

6. A system as set forth in claim 5 wherein said one destination location has received many messages from a source network in said subset as part of a denial of service attack.

7. A system as set forth in claim 5 wherein the determining means comprises:
  means for collecting from routers information indicating a routing path from each of said multiplicity of source networks to each of said plurality of destination locations.

8. A system as set forth in claim 7 wherein the determining means further comprises:
  means for determining from said router paths a number of hops from each of said multiplicity of source networks to each of said plurality of destination locations.

9. A computer program product for source of malicious network messages, said computer program product comprising:
  a non-transitory computer readable storage medium;
  program instructions to identify a subset of a multiplicity of source networks, said subset including one or more source networks which have sent messages to one of a plurality of destination locations having a same Internet Protocol (IP) address, wherein said program instructions to identify said subset comprises:
    first program instructions to determine for each of said multiplicity of source networks whether there are fewer intervening hops from said each source network to said one destination location than from said each source network to other of said plurality of destination locations; and
    second program instructions, responsive to a determination that there are fewer intervening hops from said each source network to said one destination location than from said each source network to other of said plurality of destination locations, to identify said each source network as included in said subset, and responsive to a determination that there are not fewer intervening hops from said each source network to said one destination location than from said each source network to other of said plurality of destination locations, to not identify said each source network as included in said subset;
  wherein one or more source networks are continuing to send messages to said one destination location, and further comprising program instructions to sequentially apply filters to block messages from respective source networks in said subset to determine which source network in said subset is sending said messages, wherein one of said source networks in said subset has sent said messages to said one destination location and said messages are malicious; and wherein
    all of said program instructions are stored on said non-transitory computer readable storage medium.

10. A computer program product as set forth in claim 9 wherein said one destination location has received many messages from a source network in said subset as part of a denial of service attack.

11. A computer program product as set forth in claim 9 wherein the first program instructions comprise:
  third program instructions to collect from routers information indicating a routing path from each of said multiplicity of source networks to each of said plurality of destination locations; and wherein said third program instructions are stored on said medium.

12. A computer program product as set forth in claim 11 wherein the first program instructions further comprise:
  fourth program instructions to determine from said router paths a number of hops from each of said multiplicity of source networks to each of said plurality of destination locations; and
  wherein said fourth program instructions are stored on said medium.

* * * * *